United States Patent [19]

Kraft

[11] 4,256,699

[45] Mar. 17, 1981

[54] PRESSURE EQUALIZATION SYSTEM

[75] Inventor: Dennis Kraft, Thousand Oaks, Calif.

[73] Assignee: Bunker Ramo Corporation, Oak Brook, Ill.

[21] Appl. No.: 955,138

[22] Filed: Oct. 26, 1978

[51] Int. Cl.³ ............................................. B01J 19/08
[52] U.S. Cl. ........................... 422/166; 73/170 A; 422/238; 422/239
[58] Field of Search ............... 422/129, 165, 166, 236, 422/238, 242, 239; 9/321, 323, 325; 73/170 A, 299, 708

[56] References Cited

U.S. PATENT DOCUMENTS

| 3,268,298 | 8/1966 | Costa et al. | 422/236 X |
| 3,293,676 | 12/1966 | Link | 73/170 A X |
| 3,372,996 | 3/1968 | Barrett et al. | 422/129 |
| 3,871,684 | 3/1975 | Staudacher et al. | 422/165 X |
| 3,898,048 | 8/1975 | Barber et al. | 422/165 |
| 3,930,804 | 1/1976 | Hickey, Jr. | 422/166 |

Primary Examiner—William A. Cuchlinski, Jr.
Attorney, Agent, or Firm—F. M. Arbuckle; A. Freilich

[57] ABSTRACT

A system useful in an assembly intended for use in a deep ocean environment for generating gas within the assembly to equalize the internal pressure with the external underwater pressure. In one embodiment, the gas is generated by a chemical reaction between a stored substance and the ocean water itself and, in another embodiment, the gas is generated by a reaction initiated by a pyrotechnic charge.

7 Claims, 2 Drawing Figures

PRESSURE EQUALIZATION SYSTEM

BACKGROUND OF THE INVENTION

This invention relates to means for producing pressure within an assembly to equalize with the ambient pressure around the assembly and is particularly useful for assemblies intended for use in a deep ocean environment.

Devices and instrumentation used in a deep ocean environment are subjected to large hydrostatic pressures on the order of 0.5 psi per foot of depth, or a maximum of about 10,000 psi at a depth of 20,000 feet. In order to prevent the pressure from damaging the devices, the devices are generally housed in some type of pressure vessel, typically constructed of steel strong enough to withstand the large hydrostatic pressures. Such pressure vessels are typically quite bulky and heavy.

Although some devices are damaged directly by pressure and thus must be protected by a suitable pressure vessel, other devices are not damaged directly by pressure but rather by pressure-induced forces. For example, a normally-sealed device such as a transistor may be rendered inoperable if its can is forceably ruptured. However, if the can were opened in such a way that external pressure, but no contaminents, were to enter the normally sealed area, then regular operation of the device would continue. This is sometimes accomplished by means of an inert fluid which serves to transmit the hydrostatic pressure to the components while protecting them from direct contact with the ocean. The inert fluid conveys the hydrostatic pressure outside the vessel to the operating components but is prevented by a flexible diaphragm from mixing with the ocean water. A disadvantage of using a fluid to transmit pressure is that the viscosity of the fluid can prevent proper operation of the device, especially if the operation involves mechanical motion.

Semi-rigid substances such as epoxies or potting compounds have also been employed to transmit the hydrostatic pressure. Even more so than fluids, however, semi-solids may cause flexure and mechanical failure of the embedded components when the hydrostatic pressure increases.

These problems can be largely eliminated if a gas is used for pressure equalization rather than a fluid or semi-rigid substance. Heretofore, devices utilized in pressure equalization have stored such gas beforehand inside the submerged vessel itself. This has proved unsatisfactory because of the difficulty of obtaining and storing the gas at the required maximum pressures and volumes. For example, to protect a one-liter volume at 8000 psi (545 atmospheres) would require 545 liters of gas at one atmosphere pressure. The gas would have to be stored in the underwater vessel at a pressure in excess of 8000 psi. Indeed, to effect a net volume saving, the gas has to be stored at an even higher pressure—on the order of five times 8000 psi or 40,000 psi. Therefore, a trade-off exists between the overall vessel dimensions and weight versus the quantity of gas enclosed.

SUMMARY OF THE INVENTION

The present invention is directed to a system for generating gas within an assembly housing to substantially equalize the internal and external pressure acting on the housing. In accordance with the invention, the gas is generated by a reaction initiated by a spark or pyrotechnic charge or by contact between two or more substances kept isolated until the time of activation.

In one embodiment of the invention, hydrogen gas is generated within the assembly housing by a chemical reaction which readily releases hydrogen when water contacts a hydride material such as an alkaline earth hydride. More particularly, a hydrogen gas generator in accordance with the preferred embodiment utilizes a bed of lithium hydride and water as key components with the rate of generation being controlled by the amount of ocean water input. The reaction of the lithium hydride with water is as follows:

$$LiH + H_2O \rightarrow H_2 + LiOH$$

It has been found that to protect a volume of one liter at 8000 psi in accordance with the invention requires 241 cc of LiH compound. However, because the foregoing reaction produces a "waste" LiOH solution of greater volume, a compartment on the order of 400 cc must be provided. If a conventional vessel were constructed to withstand the same 8000 psi hydrostatic pressure, it would require a diameter of 10 cm, a length of 13 cm, walls of 1 cm thickness, end caps of 2 cm thickness, and would thus occupy a volume of about 750 cc. Accordingly, a volume represented by the difference between 750 cc and 400 cc savings can be achieved by utilizing teachings in accordance with the present invention.

The novel features of the invention are set forth with particularity in the appended claims. The invention will best be understood from the following description when read in conjunction with the accompanying drawings.

DETAILED DESCRIPTION

Figure 1:
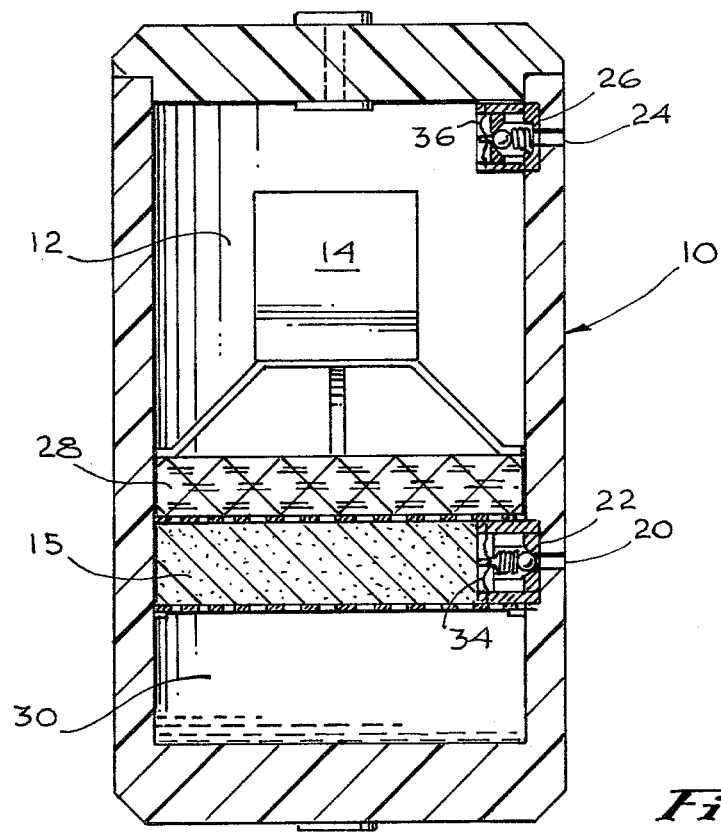
FIG. 1 illustrates a pressure equalization system in which water activates the generation of gas.

Attention is initially directed to FIG. 1 which illustrates a first embodiment of the invention including a housing 10 constructed of a durable material capable of withstanding the mechanical stresses typically encountered in an underwater ocean environment. The housing 10 may be constructed of wrapped fiber glass impregnated with a suitable resin such as epoxy or polyester, as contrasted with steel or other heavy materials traditionally used to withstand large hydrostatic pressures. The primary function of the housing 10 is to define a volume 12 which houses a device or instrument 14 to be protected. In accordance with the invention, means are provided to produce a gas within the volume 12 at a pressure substantially equal to the outside hydrostatic pressure.

In the embodiment of FIG. 1, the housing 10 contains a quantity of a suitable chemical compound 15 which is characterized by its chemical reaction to contact by sea water to produce a gas. In the embodiment of FIG. 1, lithium hydride, LiH, may be selected for use as compound 15.

The lithium hydride 15 is preferably introduced into housing 10 in paste form prepared with a water soluble, organic dispersant. As taught by U.S. Pat. No. 3,372,996, various organic solvents of the type including tetrahydrofuran, diglyme, dioxane, and trialkyl amines are non-reactive toward lithium hydride and yet are water-soluble. The advantages of such a paste are that the reaction rate is controlled to prevent violent hydrolysis of very fine lithium hydride particles and the hydride is prevented from caking to insure a smooth and even hydrolysis.

The housing 10 has a water inlet 20 formed in the wall thereof which is provided with a check valve 22 which enables ocean water to flow therepast into the housing when the outside pressure exceeds the pressure within the housing. Should the pressure inside the housing 10 be lower than the outside hydrostatic pressure, then the check valve in inlet 20 will open to permit water to enter the housing 10 and contact the compound 15. The water will react with the lithium hydride 15 to produce a pressure equalizing gas. When the pressure differential falls below a certain level, the inlet check valve 22 will close to maintain the pressure within the housing. The housing is also provided with a gas outlet 24 containing a pressure relief check valve 26 to permit gas to be exhausted from the housing to prevent overpressurization therein. Should the pressure within the housing 10 exceed a certain threshold with respect to the outside hydrostatic pressure, then the pressure relief valve 26 opens to release an amount of gas through outlet 24 sufficient to equalize the inside and outside pressure. When the pressure inside housing 10 decreases to a level equal to that of the outside hydrostatic pressure, the pressure relief valve closes and no more gas is exhausted through outlet 24. The function of the check valves, therefore, is to maintain a pressure differential between the interior of the housing and the external hydrostatic pressure within close bounds. A second function is to permit generation of gas only when needed and thereby prevent premature depletion of the gas-producing compound 15. Furthermore, if the device in normal operation varied slightly in depth, then this motion, without the use of check valves, would also rapidly exhaust the gas-producing compound. Additionally, in order to conserve the gas-producing compound 15, it is preferred to incorporate frangible diaphragms 34, 36 over the inlet 20 and outlet 24, respectively, in order to defer generation of gas production entirely until the unit has sunk to approximately forty feet. If placed on the outside of housing 10, the diaphragms also serve to protect the valves 22 and 26 prior to operation.

A filter/dryer unit 28 is located directly adjacent the water inlet 20 and between the inlet and the protected device 14. The unit 28 functions as a filter, permitting only gases to pass through it.

In an embodiment utilizing lithium hydride as compound 15, when the lithium hydride is contacted by water, it releases hydrogen gas, H2, in a reaction which can be expressed as follows: $LiH + H_2O \rightarrow H_2 + LiOH$. In addition to the desired hydrogen gas H2, the reaction produces a waste solution LiOH. Since the filter unit 28 only passes gas, the waste solution will be blocked and will be collected in compartment 30 at the bottom of housing 10. At the same time, the filter unit 28 permits the hydrogen gas H2 to pass therethrough and consequently pressurize the volume 12. Filter/dryer unit 28 also functions to dry the gasses passing through it. Any moisture from the ocean water entering through inlet 20 below is prevented by the dryer unit from contaminating the protected volume 12. Suitable filter/dryer units 28 are well-known in the art and may be constructed utilizing present technology.

Figure 2:
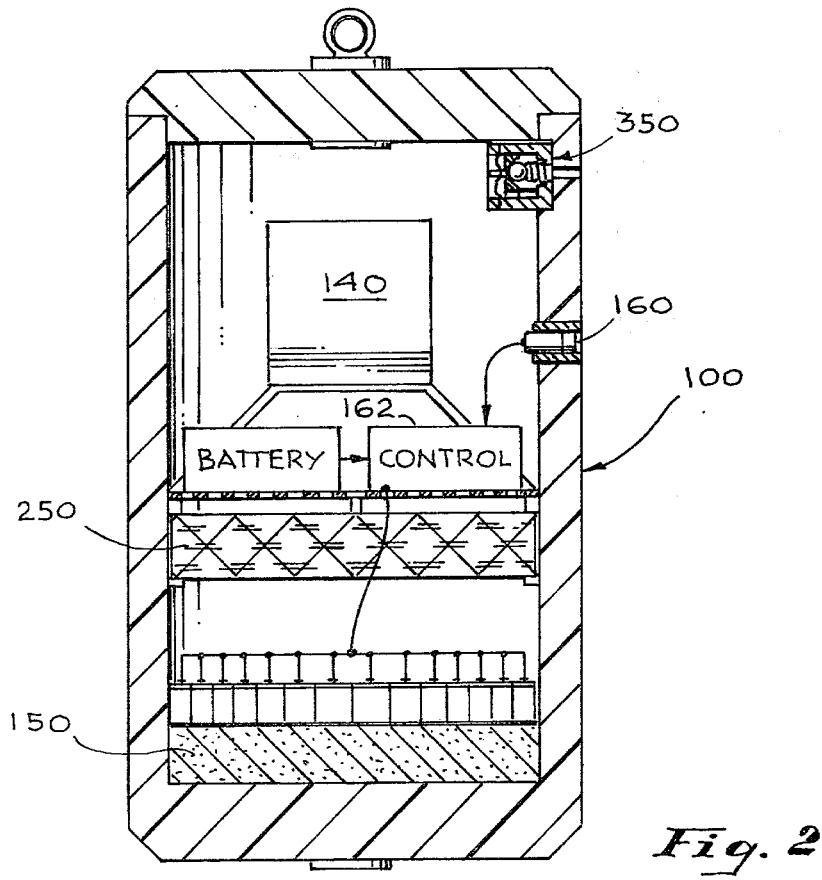
FIG. 2 illustrates an alternative embodiment in which a pyrotechnic charge activates the gas generation.

FIG. 2 illustrates another embodiment of the invention wherein a gas is produced by a pyrotechnic charge which initiates a chemical reaction. A housing 100 is constructed as hereinabove described with reference to FIG. 1 except, however, that the water inlet is deleted. A suitable compound 150 for generating gas in response to a pyrotechnic charge rests upon the bottom of the vessel housing 100. Such a compound may be a nitrogen-producing solid propellant such as a sodium azide with binder. Instead of water activating a gas-producing reaction, a pressure transducer means 160 is provided for triggering a pyrotechnic charge. The pressure transducer means 160 responds to a differential between the inside and outside pressure to produce an initiating signal to a battery powered control circuit 162 which then sequentially triggers as many pyrotechnic charges as are necessary to raise the inside pressure. As an example, the control circuit can supply a current to an electric match ignitor which in turn could ignite a small quantity of black powder.

A filter unit 250 is also provided to permit the gases to penetrate only those areas of the vessel 100 where the protected unit 140 containing instrumentation for underwater research is located. An outlet orifice 350 is also provided as in FIG. 1 to prevent over-pressurization.

Although particular embodiment of the invention have been described and illustrated herein, it is recognized that modifications and variations may readily occur to those skilled in the art, and consequently it is intended that the claims be interpreted to cover such modifications and equivalents.

What is claimed is:

1. An apparatus useful in a deep ocean environment for housing a functional device comprising:
    a substantially closed vessel for underwater use defining a first substantially moisture free chamber for enveloping and protecting said functional device;
    a quantity of a selected gas producing material supported in said vessel;
    means responsive to increases in the pressure of the external environment surrounding said apparatus for initiating the production of gas by said gas producing material;
    means for communicating said gas with said first chamber; and
    means for regulating the gas pressure within said first chamber to stabilize at a value approximately equal to the external pressure of the environment surrounding said apparatus.

2. The apparatus of claim 1 wherein said means for regulating includes an outlet orifice; and
    means associated with said outlet orifice and responsive to a differential between the pressure in said vessel and in said surrounding environment for controlling the flow of gas from within said vessel to said surrounding environment.

3. The apparatus of claim 1 including inlet means in said vessel for permitting the entry of water; and wherein
    said means for causing said material to produce a gas includes means for causing the water entering said vessel to contact said material.

4. The apparatus of claim 3 wherein said gas producing material comprises lithium hydride.

5. The apparatus of claim 3 including filter means separating said first chamber and said gas producing material for allowing gas communication but not liquid communication therebetween.

6. The apparatus of claim 1 wherein said means for causing said material to produce a gas includes means responsive to the pressure differential between the pressure in said vessel and in said surrounding environment.

7. The apparatus of claim 6 wherein said means responsive to the pressure differential includes means for producing a pyrotechnic charge; and wherein said gas producing material is responsive to said charge to produce a gas.

* * * * *